United States Patent
Föster

(10) Patent No.: US 8,773,228 B2
(45) Date of Patent: Jul. 8, 2014

(54) ACTUATOR WHICH CAN BE ACTUATED ELECTROMAGNETICALLY, PARTICULARLY FOR AN ADJUSTABLE DAMPING VALVE OF A VIBRATION DAMPER

(75) Inventor: Andreas Föster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/330,783

(22) Filed: Dec. 20, 2011

(65) Prior Publication Data

US 2012/0187778 A1 Jul. 26, 2012

(30) Foreign Application Priority Data

Jan. 24, 2011 (DE) .......................... 10 2011 003 054

(51) Int. Cl.
 *H01F 7/08* (2006.01)
(52) U.S. Cl.
 USPC .......................................... 335/220; 335/181
(58) Field of Classification Search
 USPC .......................................... 335/181, 261, 279
 See application file for complete search history.

(56) References Cited

U.S. PATENT DOCUMENTS

| | | | | |
|---|---|---|---|---|
| 3,750,066 A | * | 7/1973 | Lazenby | 335/274 |
| 3,851,285 A | * | 11/1974 | Rothfuss et al. | 335/262 |
| 4,604,600 A | * | 8/1986 | Clark | 335/261 |
| 5,301,776 A | * | 4/1994 | Beck | 188/322.13 |
| 5,413,196 A | * | 5/1995 | Forster | 188/266.6 |
| 5,565,832 A | * | 10/1996 | Haller et al. | 335/249 |
| 5,850,896 A | * | 12/1998 | Tanaka | 188/266.2 |
| 6,615,780 B1 | * | 9/2003 | Lin et al. | 123/90.17 |
| 7,199,687 B2 | * | 4/2007 | Maruhashi et al. | 335/131 |
| 7,315,230 B2 | * | 1/2008 | Hoffman | 335/255 |
| 7,347,221 B2 | * | 3/2008 | Berger et al. | 137/628 |
| 7,377,290 B2 | * | 5/2008 | Albert et al. | 137/375 |
| 7,626,288 B2 | * | 12/2009 | Protze | 335/209 |
| 7,750,772 B2 | * | 7/2010 | Hagen et al. | 335/279 |
| 2004/0257185 A1 | * | 12/2004 | Telep | 335/220 |
| 2010/0252766 A1 | * | 10/2010 | Forster | 251/129.15 |

* cited by examiner

*Primary Examiner* — Shawki S Ismail
*Assistant Examiner* — Lisa Homza
(74) *Attorney, Agent, or Firm* — Cozen O'Connor

(57) ABSTRACT

Actuator which can be actuated electromagnetically includes a coil, a magnetically conductive actuator sleeve being fixed in the magnetic field thereof. The magnetic field passes radially from the actuator sleeve to an axially movable armature and passes axially in the area of a pole plane from the armature to a return member which is stationary with respect to the actuator and, in so doing, generates a magnetic force which displaces the armature. The actuator sleeve for the magnetic flux of the coil has at least two functionally parallel passage areas having different cross sections for receiving the armature which has a conducting profile complementary to the actuator sleeve.

6 Claims, 3 Drawing Sheets

ACTUATOR WHICH CAN BE ACTUATED ELECTROMAGNETICALLY, PARTICULARLY FOR AN ADJUSTABLE DAMPING VALVE OF A VIBRATION DAMPER

BACKGROUND OF THE INVENTION

1. Field of the Invention

The present invention is directed to an electromagnetically actuated actuator particularly for an adjustable damping valve of a vibration damper.

2. Description of the Related Art

One of the many uses for actuators which can be actuated electromagnetically is in adjustable damping valves in vibration dampers. Particularly in the case of vibration dampers, there is a demand for high adjusting forces combined with small installation spaces and low electric currents. This conflict could not be resolved heretofore without difficulty. DE 10 2009 016 464 B3 shows an actuator which can be actuated electromagnetically for actuating a valve body. The actuator comprises a coil in which a magnetically conductive actuator sleeve is arranged. An armature slides within the actuator sleeve and, like the actuator sleeve, has a constant diameter and, therefore, a passage cross section for the magnetic field from the actuator sleeve to the armature. A pole plane in which the magnetic field passes axially from the armature to a return member of the actuator has a diameter that is determined by the constant inner diameter of the actuator sleeve and of an insulator.

SUMMARY OF THE INVENTION

It is an object of the present invention to achieve a maximum actuating force with a given installation space of the actuator.

This object is met in that the actuator sleeve for the magnetic flux of the coil has at least two functionally parallel areas having different cross sections for receiving the armature which has a conducting profile complementary to the actuator sleeve.

The advantage of the invention consists in that, compared to the prior art, better use is made of the cross-sectional areas of the actuator sleeve which conduct magnetic flux.

In a further advantageous development, the pole plane has at least the cross-sectional size of the largest passage area of the actuator sleeve. Owing to the stepped contour of the actuator sleeve, the armature can also have a stepped contour which allows the pole plane to be increased in size. The greater the dimensioning of the pole plane, the greater the magnetic force that can be achieved.

In order to make the best possible use of the passage areas at a given armature length, it is advantageous when an enclosed angle at a step between the at least two passage areas of the conducting profile of the armature is less than 90°.

According to an advantageous embodiment, the wall thickness of the actuator sleeve at the at least two passage areas is differently dimensioned. The wall thickness is greater in a first length area which corresponds at least to the length of the first passage area than in the second length area which has at least the length of the second passage area. In the first length area, the magnetic flux for the first passage area and the second passage area must pass through with the least resistance possible, whereas in the second length portion this applies only to the magnetic flux for the second passage area. Since the magnetic flux at the second passage area is less than in the first length portion, the cross section of the second length portion can be constructed with a thinner wall thickness.

For an advantageous arrangement of the actuator sleeve relative to the coil, a lateral surface of the actuator sleeve facing the coil has a constant diameter.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The present invention is further described in detail below in conjunction with the drawings, in which.

DETAILED DESCRIPTION OF THE PRESENTLY PREFERRED EMBODIMENTS

Figure 1:
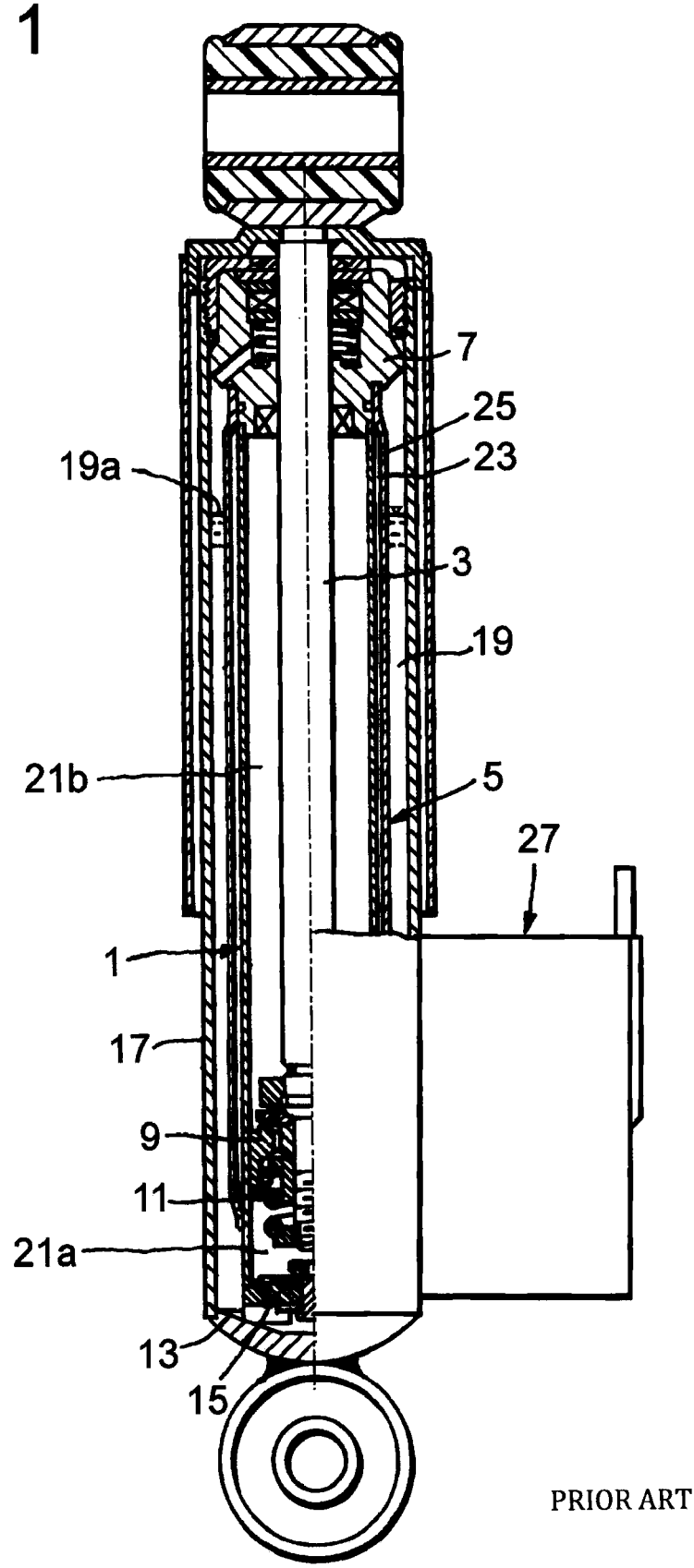
FIG. 1 shows a vibration damper with a damping valve device.

In FIG. 1, a vibration damper has a cylinder 1 in which a piston rod 3 is arranged so as to be axially movable. The piston rod 3 is guided out of the top end of the cylinder by a guiding and sealing unit 7. A piston unit 9 having a piston valve arrangement 11 is fastened to the piston rod 3 inside the cylinder 1. The bottom end of the cylinder 1 is closed by a base plate 13 having a bottom valve arrangement 15. The cylinder 1 is enclosed by a reservoir tube 17. The reservoir tube 17 and an intermediate tube 5 form an annular space 19 presenting an equalizing chamber. The space inside the cylinder 1 is divided by the piston unit 9 into a first work chamber 21a and a second work chamber 21b. The first work chamber 21a and second work chamber 21b are filled with damping fluid. The equalizing chamber 19 is filled with liquid up to level 19a and, above this, with gas. A first conduction path, namely a high-pressure section 23, is formed inside the equalizing chamber 19 and communicates with the second work chamber 21b via a bore hole 25 of the cylinder 1. An adjustable valve damping device 27 which is fitted laterally to the reservoir tube 17 adjoins this high-pressure section. A second conduction path, namely a low-pressure section 29 (not shown), leads from the valve damping device 27 into the equalizing chamber 19.

As the piston rod 3 moves upward out of the cylinder 1, the upper second work chamber 21b decreases in size. A positive pressure builds up in the upper work chamber 21b and can only be dissipated through the piston valve arrangement 11 in the lower work chamber 21a as long as the adjustable damping valve 27 is closed. When the adjustable damping valve 27 is opened, liquid simultaneously flows from the upper work chamber 21b through the high-pressure section 23 and the adjustable damping valve 27 into the equalizing chamber 19. Accordingly, the damping characteristic of the vibration damper when the piston rod 3 moves out depends on whether the adjustable damping valve 27 is more or less open or closed.

When the piston rod 3 moves into the cylinder 1, a positive pressure develops in the lower work chamber 21a. Liquid can flow from the lower work chamber 21a through the piston valve arrangement 11 upward into the upper work chamber 21b. The liquid which is displaced by the increasing piston rod volume inside the cylinder 1 is expelled through the bottom valve arrangement 15 into the equalizing chamber 19. An increasing pressure likewise occurs in the upper work chamber 21b because the flow resistance of the piston valve arrangement 11 is less than the flow resistance of the bottom valve arrangement 15. This increasing pressure can flow into the equalizing chamber 19 again through the high-pressure section 23 when the damping valve 27 is opened. This means that the shock absorber has a softer characteristic when the adjustable damping valve 27 is opened and a harder characteristic when the damping valve 27 is closed both when the piston rod moves in and also when it moves out. It should be noted that the flow direction through the high-pressure section 23 of the bypass is always the same regardless of whether the piston rod moves in or out.

Figure 2:
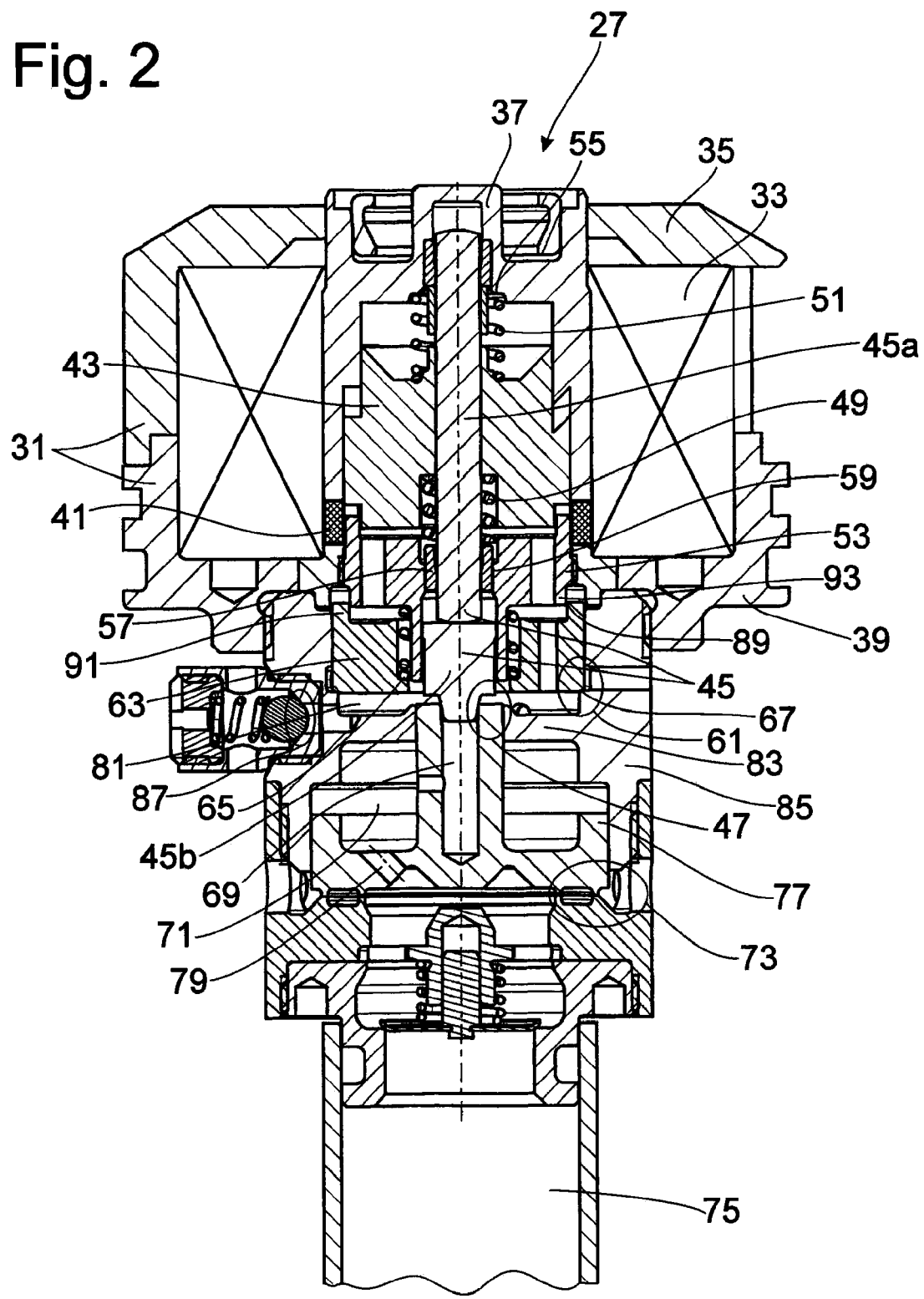
FIG. 2 shows a cross-sectional view of a damping valve device with first valve and emergency operation valve arranged in series.

FIG. 2 shows the damping valve device 27 in a housing 31 which is fastened externally to the reservoir tube 17 or inside the cylinder 1, e.g., to the piston rod 3. A ring-shaped magnetic coil 33 is arranged in the housing 31. An opening in a housing cover 35 is closed by an actuator sleeve 37 having a base. An insulator 41 insulating against the magnetic flux of the magnetic coil 33 is arranged between a bottom housing part 39 and the actuator sleeve 37.

Inside the actuator sleeve 37, a valve armature 43 together with a valve body 45 of a first valve 47 floats axially against the force of a spring assembly which acts on both sides of the valve armature 43 and, therefore, also on both sides of the valve body 45. The spring assembly comprises at least one spring 49 per side directed opposite to the spring 51 on the other side of the valve armature 43. A magnetic flux guiding element 53 which has only a low magnetic flux resistance, i.e., has good magnetic conductivity, is fixed to the bottom housing part 39.

The valve body 45 of the first valve 47 is supported in the base of the actuator sleeve 37 on one hand and in the magnetic flux guiding element 53 on the other hand. A first spring seat 55 for the at least one spring 51 is formed by the actuator sleeve 37. A second spring seat 57 engages in a through-opening 59 of the magnetic flux guiding element 53; the valve body 45 of the first valve element 47 also extends through this through-opening 59. The second spring seat 57 is accessible via the through-opening 59 and forms an interference fit. This makes it possible for the second spring seat 57 to be axially displaceable within limits after the magnetic flux guiding element 53 has already been mounted so that the spring assembly 49, 51 can be retensioned. Any manufacturing tolerances can be compensated by retensioning.

An emergency operation valve 61 is arranged in the housing 31 axially in series with the first valve 47; the magnetic flux guiding element 53 is arranged between the two valves 47, 61. A valve body 63 of the emergency operation valve 61 is constructed annularly and is arranged concentric to the valve body 45 of the first valve 47. A pre-loading spring 65 which is supported at the magnetic flux guiding element 53 tensions the valve body 63 of the emergency operation valve 61, which is constructed as a seat valve, on a valve seat surface 67 of the housing 85.

The valve body 45 of the first valve 47 is formed of multiple parts in its movement direction; at least two length portions 45a, 45b of the valve body 45 can execute an angular movement relative to one another. Length portion 45b is supported inside the through-opening 59 of the magnetic flux guiding element 53 so as to be angularly movable and is moved by its end face by the length portion 45a connected to the valve armature 43.

The second length portion 45b of the first valve 47 acts on a flow-off opening 69 of a control space 71 of a main stage valve 73 which is controlled by the first valve 47. The main valve 73 is connected to a work space 21a, 21b of the vibration damper by a connection piece 75. The damping medium exerts a lifting force on a main stage valve body 77 in opposition to a closing force of the first valve 47. Additionally, a pressure of the pressure medium in the control space 71, which is connected to the connection piece 75 via a connection opening 79 in the main stage valve 73, exerts a closing force on the main stage valve body 77. Depending on the force with which the first valve 47 holds the flow-off opening 69 of the main stage valve 73 closed, the main stage valve body 77 lifts up from its valve seat surface so that the damping medium can flow off radially via the valve seat into an equalizing chamber 19 or a work space of the vibration damper.

The closing force of the first valve 47 is determined by the energization by means of the magnetic coil 33. High energization leads to a high closing force, and there is minimum closing force in the absence of current. Particularly when energization is very low, the damping medium can flow into an intermediate space 81 of the housing 31 which extends between a lower side of the magnetic flux guiding element 53 and an upper side of an intermediate wall 83 of the housing 85 to the main stage valve 73. The outflow from this intermediate space is determined by the emergency operation valve 61 and possibly by a pressure relief valve 87. In the de-energized state, the emergency operation valve 61 is held by the pre-loading spring 65 in a closed position on the valve seat surface 67. The first valve 47 and the emergency operation valve 61 are arranged in series with respect to the flow path of the damping medium proceeding from the connection piece 75.

Low energization results in a magnetic flux which proceeds radially from the bottom housing part 39 into the valve body 63 of the emergency operation valve 61. There is a lower resistance between an edge 89 of the valve body 63 and the magnetic flux guiding element 53 than between the valve seat surface 67 and the valve body 63 so that the magnetic flux exerts a lifting force on the valve body 63 in direction of the magnetic flux guiding element 53. The magnetic flux proceeds via the length portion of the valve body 45a of the first valve 47, which length portion is located in the valve armature 43, to the valve armature and to the actuator sleeve 37. The low current is not yet sufficient to significantly move the first valve body 45 of the first valve 47 in direction of the flow-off opening 69. The air gap adjusted by the spring assembly 49, 51 between the valve armature 43 and the upper side of the magnetic flux guiding element 53 is not overcome until energization increases. When the emergency operation valve 61 is open, the magnetic resistance in the transition from the bottom housing part 39 along the valve body 63 of the emergency operation valve 61 to the magnetic flux guiding element 53 decreases again because the radial overlap between a circumferentially extending web 91 of the valve body 63 of the emergency operation valve 61 and a shoulder 93 at the magnetic flux guiding element 53 increases with the lifting movement of the emergency operation valve 61.

In the absence of current in the magnetic coil 33 and when the emergency operation valve 61 is closed, the pressure relief valve 87 is available for allowing damping medium to flow out of the intermediate space 81 into a work space 21a, 21b or equalizing chamber 19 and accordingly prevents an overloading of the entire vibration damper.

Figure 3:
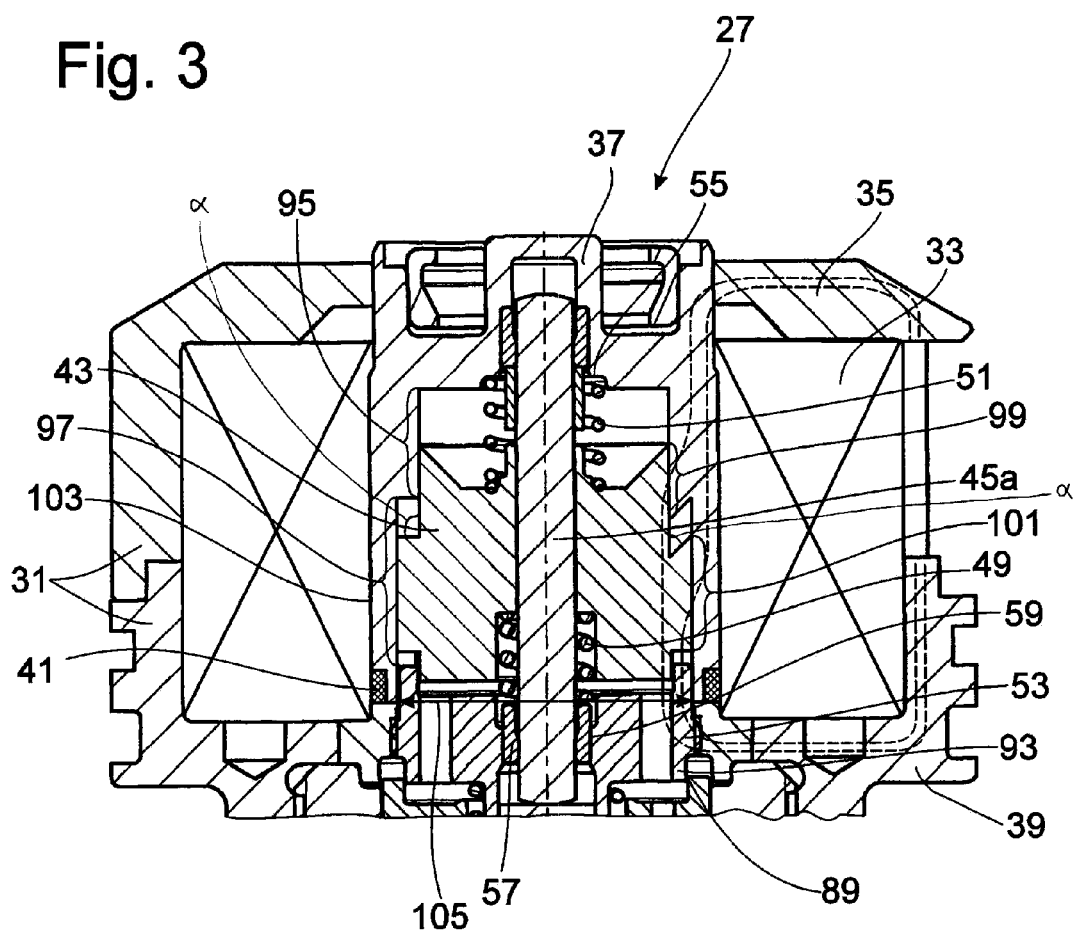
FIG. 3 is an illustration of the magnetic flux at the armature of the present invention.

FIG. 3 shows a section of the damping valve device in the area of the armature 43. For the magnetic flux of the coil 33, the actuator sleeve 37 has at least two functionally parallel passage areas 95, 97 having different cross sections for receiving the armature 43 which has a conducting profile 99, 101 complementary to the actuator sleeve 37. The magnetic flux is indicated by dashed lines for a clearer understanding. By "parallel" is meant that two passage areas are present and the magnetic flux is guided in part via the first passage area and in part via the second passage area.

A lateral surface 103 of the actuator sleeve 37 facing the coil has a constant diameter so that there are no changes in the magnetic coil 33 or in the installation space required by the latter compared to the prior art.

The wall thickness and, therefore, the cross-sectional area of the actuator sleeve 37 are carried out differently in the at least two passage areas 95, 97. In one length portion which corresponds at least to the length of the first conducting profile 99, the wall thickness is greater because, as is shown by the illustration of the magnetic flux, a greater magnetic flux must be conducted through this length portion. The greater the dimensioning of the wall thickness, the lower the conduction resistance.

However, a pole plane 105 has at least the radial extension of the largest passage area 97 of the actuator sleeve 37. Accordingly, the pole plane 105 represents the axial passage area of magnetic flux between the armature 43 and the return element on the actuator side, in this case, the magnetic flux guiding element 53. The pole plane 105 need not be made up of an individual plane surface, but may also be formed in a stepped manner as in the present case.

On the left-hand side of the cross-sectional view shown in FIG. 3, an angle α enclosed between the conducting profiles 99, 101 at a step is exactly 90°. This constructional shape can be manufactured particularly easily. Better use is made of the available structural length of the armature 43 when the enclosed angle α at the step between the at least two conducting profiles 99, 101 of the armature 43 is less than 90° as is shown on the right-hand side of the section. A larger axial overlap between the armature 43 and the actuator sleeve 37 is achieved. For other reasons, e.g., safe venting of the system, an angle greater than 90° can also be useful.

The invention is not limited by the embodiments described above which are presented as examples only but can be modified in various ways within the scope of protection defined by the appended patent claims.

I claim:

1. An actuator which can be actuated electronically from a switched-off position to a switched-on position, comprising:
    a coil (33) for generating a magnetic field;
    a magnetically conductive actuator sleeve (37) surrounded by said coil (33);
    a magnetic flux guiding element (53) arranged stationary with respect to said actuator sleeve (37);
    an armature (43) mounted for axially sliding movement within said actuator sleeve (37); said armature having at least two axially extending, parallel, axially offset, magnetic flux conducting profiles (99, 101); and
    said actuator sleeve (37) comprising at least two magnetic flux conducting parallel passage areas (95, 97) of different cross-section and complementary to and facing said magnetic flux conducting profiles of said armature for permitting respective ones of said conducting profiles of said armature (43) to slide along respective ones of said parallel passage areas; said at least two axially extending, parallel, axially offset, magnetic flux conducting profiles (99, 101) contacting said at least two magnetic flux conducting passage areas (95, 97) in the switched-off position as well as in the switched-on position.

2. The actuator according to claim 1, wherein one of said at least two passage areas is the relatively largest passage area and having a radial extension; and wherein said actuator additionally comprises a pole plane (105) having at least the radial extension of said largest passage area of said actuator sleeve (37).

3. The actuator according to claim 1, additionally comprising a step defining an enclosed angle (α) between said at least two conducting profiles (99, 101) of said armature (43); said enclosed angle (α) being less than 90°.

4. The actuator according to claim 1, wherein said at least two passage areas (95, 97) of said actuator sleeve (37) have a different wall thickness.

5. The actuator according to claim 1, wherein said actuator sleeve has a lateral surface (103) facing said coil, said lateral surface having a constant diameter.

6. An actuator which can be actuated electronically, comprising:
    a coil (33) for generating a magnetic field;
    a magnetically conductive actuator sleeve (37) surrounded by said coil (33);
    a magnetic flux guiding element (53) arranged stationary with respect to said actuator sleeve (37);
    an armature (43) mounted for axially sliding movement within said actuator sleeve (37); said armature having at least two axially extending, parallel, axially offset, magnetic flux conducting profiles (99, 101); and
    said actuator sleeve (37) comprising at least two magnetic flux conducting parallel passage areas (95, 97) of different cross-section and complementary to and facing said magnetic flux conducting profiles of said armature for permitting respective ones of said conducting profiles of said armature (43) to slide along respective ones of said parallel passage areas; said at least two magnetic flux conducting passage areas (95, 97) conducting magnetic flux from said actuator sleeve (37) through said at least two magnetic flux conducting profiles (99, 101) into said armature (43).

* * * * *